M. MAGINN.
SURFACE STREET OR ROAD RAILWAY FOR AUTOMOBILES AND OTHER VEHICLES.
APPLICATION FILED SEPT. 15, 1906.
912,478.
Patented Feb. 16, 1909.
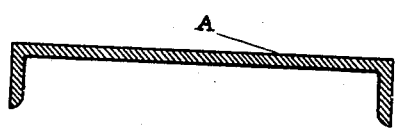
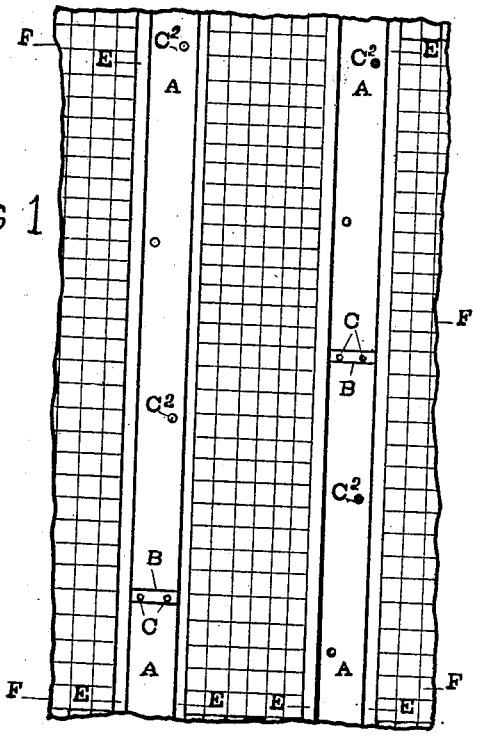
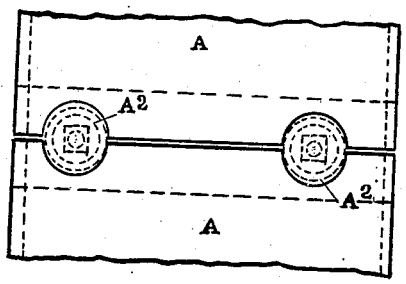
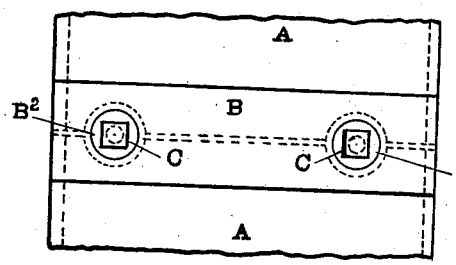
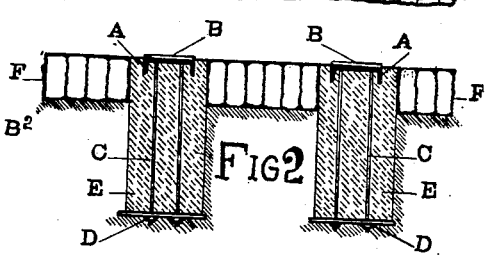
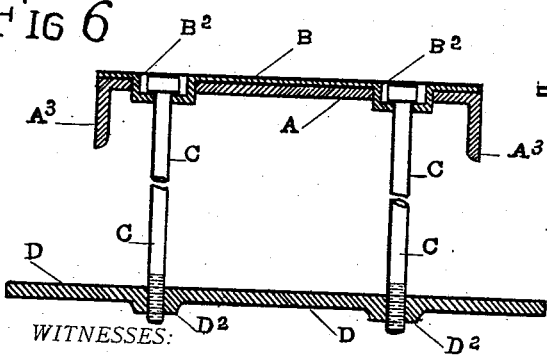
WITNESSES:
INVENTOR.
Madison Maginn

UNITED STATES PATENT OFFICE.

MADISON MAGINN, OF CHICAGO, ILLINOIS.

SURFACE STREET OR ROAD RAILWAY FOR AUTOMOBILES AND OTHER VEHICLES.

No. 912,478.　　　　Specification of Letters Patent.　　　Patented Feb. 16, 1909.

Application filed September 15, 1906. Serial No. 334,729.

*To all whom it may concern:*

Be it known that I, MADISON MAGINN, a citizen of the United States, residing at Chicago, in the county of Cook and State of Illinois, have invented a new and useful Surface Street or Road Railway for Automobiles and other Vehicles, of which the following is a specification.

My invention relates to traction vehicles, and more particularly to automobiles, but is adapted to most any style of vehicle, operated either mechanically, or manually, or to vehicles moved by animal power, or other power for transportation purposes.

Heretofore it has been the custom to construct rail ways with rails so formed and shaped, as will of themselves guide the vehicles so operating upon such rails; but my invention relates to that class of rail ways, which provide a traction way for vehicles, in which such vehicles can be guided to and upon said road way, and rail way, either by manual means or mechanical means, each as desired. And the objects of my improvements are: 1st, to provide ways and means, for constructing a street or road rail way, in such a manner as will not deface any paving that the street or road may be provided with, and in which my improved rail way may be laid in conjunction therewith. 2d, to provide ways and means, whereby any street or road way, may have in addition thereto, a rail way, whereby the wheels of any vehicle may operate upon said rail way, to the advantages of moving greater loads, carried by said vehicles, with greater speed of movement, and with less labor and power expended. 3d to provide ways and means, in a surface street or road rail way, whereby the operators of vehicles, operating upon said rail way, can with ease and despatch, move their vehicles either off or upon said rails or rail way, at any place desired, along said rail way tracks, and by whatever means such vehicles employ for such operation and propulsion. 4th, to provide ways and means, in a street or road rail way, whereby any ordinary street or road way, both in city and country, can be effectively equipped with a rail way, and be of great benefit, without offering any obstructions to such street or road way, or to its operation as a public high way. 5th, to provide ways and means, in a street or road rail way construction, whereby the said street or road in which said rails are erected and placed, will be of the same smooth and even ground or paved surface, as is the surface of the said street or road way, to which the said rail way and its rails may be applied. I attain these objects by the mechanism employed as illustrated in the accompanying drawings in which—

Figure 1, is a ground or plan view of a paved street, having my improved street or road rail way applied. Fig. 2, is a cross section, in elevation, of a section of street pavement, having my improved street or road rail way applied. Fig. 3, is a cross section of one of the rails, employed in the construction of my improved street or road rail way. Fig. 4, is a plan view of the ends, at the top, of the joints of two rails, showing the preparation of the ends of the rails for splicing. Fig. 5, is a plan view at the top of a rail joint, or splicing complete. Fig. 6, is a cross section, in elevation, of a rail joint, with splicing cap or plate, bolts, and anchor plate. Fig. 7, is a side elevation of the splicing plate or cap, employed at the ends of the rails. Fig. 8, is a depression washer, for the intermediate rail bolts, securing the rails to the structure.

Similar letters refer to similar parts throughout the several views.

In the drawings the letter A, represents the rails of a surface street or road rail way; in this construction I have employed and shown the rails to be channel iron shape; while I prefer this construction shown, I am aware that any plain or other well known metal plate construction, properly braced or reinforced, can be substituted for the channel shape, and produce fair results, with my arrangement of road bed as here shown and described.

The letter $A^2$, represents where a portion or part of the surface of the rails at their ends, is removed, and prepared to receive a suitable splicing plate or cap, for splicing the rails together longitudinally; while there are various ways and means of constructing a rail splice, and splicing plates, I prefer the one illustrated in Figs. 4, 5, and 6.

I have shown in Fig. 4, "dotted lines," running at a right angle across the rails, a modification of preparing the two ends of the rails A, for splicing, by removing an equal portion from the top surface of the rails A, the width and depth of the splicing plate or cap B. I then place the splicing plate or cap, B, into this prepared groove, formed by the removing of the aforesaid top surface, as indicated by the dotted lines in Fig. 4, and secure the cap B, to this plate, by the bolts C. This means of splicing makes the ends of the rails and the splice plate, of even surfaces at the top. B², represents a depression, formed in the splice plate B, sufficient in size, to receive the head of a bolt, or a nut; said depressions are sunk deep enough, to house and contain the entire head of the bolts C, in the position shown in Fig. 6, with the top or end of the bolt head, about even with the top surface of the plate B; there is also a perforation in the depression B², which the bolts C, pass through, and secure the same to the anchor plates D, which in this construction are placed under the foundation of the road bed structure, as illustrated in Fig. 2. The anchor plates D, are provided with a prepared perforation D², threaded, to receive the screw ends of the bolts C. I prefer this construction to the ordinary way of passing the bolts up through the anchor plates, with the heads underneath, and the nut at the top. The construction shown, gives me the means of locking the solid head of the bolt, to the plate depression B², and prevents the loosening of the bolts C.

By referring to Fig. 1, it will be noticed that I have arranged for intermediate bolts, for securing the rails to the structure, between the rail ends, by bolts and washers C²; between the ends of the rails longitudinally, I use the depression washer as illustrated in Fig. 8, at C², arranged for the bolt C, to pass through the opening C³, using a single washer for a single bolt; the construction of the single washer C², is identical with the construction and arrangement employed with the depression in the splice plate B, at B²; all shown in Figs. 5—6—7 and 8.

The letter E, represents a structure of concrete or cement, or any mixture suitable for a bed or foundation for the rails A, to rest upon and be attached thereto. I have shown the rail support in this construction, to be of concrete, and the width of this structure wider than the rails, and continuous lengthwise with the rails of the rail way.

Having described the uses and construction of its various parts, its *modus operandi* is as follows. In a paved street or roadway, I first remove a part of the pavement, the width required for a single rail structure, of my improved rail way; then dig a trench the same width, to a total depth of eighteen inches, more or less according to the soil encountered, and the requirements of the rail way. In this trench or ditch, I first place the anchor plates D, distributing them the required distances apart; I then insert the bolts C, in the threaded portion of the anchor plates at D², with a piece of pipe surrounding the bolt loosely, from under the head of the bolt, to the anchor plates; having arranged and located the anchor plates and bolts properly, next fill in at the bottom of the trench, coarse gravel and cement, or like plastic material, filling the trench up to within a few inches of the prearranged top, of the bed of the rail way; finishing the top with a layer of fine prepared cement, concrete, or asphalt, or as desired, arranged to permit the flanges A³, of the rails A, to completely embed themselves in this last layer of preparation; after the top layer of plastic material is properly arranged, remove the bolts and piping, surrounding the bolts, as soon as the material in the trench has set, or become hardened enough to permit, and the bed portion is now ready for receiving the rails, in the manner described. Now place the rails A, upon the prepared plastic structure E, as shown in Figs. 1 and 2, and insert the washers C², in their prepared openings cut in the rails, finally returning the bolts C, minus the pieces of piping, to their respective places they occupied when the plastic filling was placed around them in the trench, and with the aid of a socket wrench, prepared to fit the depressions B², screw the bolts by their heads, up tight into the anchor plates D, thus making the plastic structure and the rails, now as one continuous piece.

In splicing the ends of the rails together upon the bed structure, the rails should be apart a little, leaving a small opening between the ends, for expansion purposes; then place the splice plate or cap B, over the ends, as shown in Fig. 6, following with the bolts C, secured tightly into place, as and by the means above described, with the socket wrench. This line of operation for construction, is repeated with every length of rail.

Having measured off the desired distance for the width of the rails apart, for track gage, commence this line of rail bed as previously described for the opposite line of rail bed, by removing the paving, the width and depth required, and arrange the trench, concrete, plastic material, rails, etc., and finish its construction exactly as the first line of rails is constructed, as they are but duplicates of each other, though entirely independent of each other's construction; care should be used in finishing the plastic material and concrete structure smooth and even with the street, or the adjoining pavement of the street, thus insuring a perfect even surface, the entire width and length of the street or road way. This arrangement of structure, makes a continuous line of foundation to the rails, equal to a solid stone sleeper, and is so arranged in conjunction with the paving of the road or street, as to make its permanency almost impossible of disarrangement; and the blending of its construction with the pavement of the road or street, makes the passage for vehicles to and upon the rails, from the street, a matter of the easiest operation; making the appearance of the street level, smooth, and a perfect road way and rail way, in one combination.

I am aware that prior to my invention, plates and rails of iron have been laid on wood sleepers, and sometimes upon the ground temporary, for the purpose of moving heavy objects of material, from one location to another; but I am not aware that this combination of devising and arranging a cheap, practical, and permanent rail way, in the streets of cities or towns, and road ways through the country, for the purposes of assisting the operation of vehicles, loaded or otherwise, in making rapid transit, and an easy and safe means for the transportation of persons and materials, has ever before been made.

Having explained the nature of my invention, and described forms for its construction, and the manner of using the same, what I claim, and desire to secure by Letters Patent is:

1. In a surface street or road rail way, the combination of, a rail support and foundation, formed of plastic material, arranged longitudinally with the rails of a rail way, rails arranged upon the top of the plastic structure, anchor plates fitted to said structure, splicing plates securing the ends of the rails, bolts securing the rails, splice plates, and anchor fastenings to the rail support, substantially as and for the purposes specified.

2. In a surface street or road rail way, the combination of, a rail support and foundation, formed of plastic material, arranged longitudinally with the rails of a rail way, rails arranged upon and at the top of the plastic structure, anchor plates fitted to said structure, splicing plates fitted to the ends of the rails, bolts securing the rails, splice plates, and anchor fastenings to the rail foundation, substantially as and for the purposes specified.

3. The combination, in a street or road rail way, a rail support and foundation, formed of plastic material, arranged longitudinally with the rails of a rail way, rails arranged upon and at the top of the plastic structure, anchor plates fitted to the plastic structure, splicing plates fitted to the ends of the rails, bolts and washers securing the rails, splice plates, and anchor fastenings to the rail support and structure, substantially as and for the purposes specified.

4. The combination, in a street or road rail way, a rail support and foundation, formed of plastic material, arranged longitudinally with the rails of a rail way, rails arranged upon and at the top of the plastic foundation, anchor plates fitted to the plastic structure, splicing plates fitted to the ends of the rails, bolts securing the rails, splice plates, and anchor fastenings to the plastic structure, bolt heads and nuts arranged away from contact with the wheels of vehicles, substantially as and for the purposes specified.

5. In a rail way, the combination of, a rail support and foundation, formed of plastic material, arranged longitudinally with the rails of a rail way, rails arranged upon and at the top of the plastic structure, anchor plates and bolts, fitted to the plastic structure, splicing plates fitted to the ends of the rails, bolts securing the rails, splice plates, and anchor fastenings to the plastic structure, bolt heads and nuts, arranged away from contact with the wheels of vehicles, substantially as and for the purposes specified.

MADISON MAGINN.

Witnesses:
W. M. HAMMOND,
GEO. M. LUCAS.